United States Patent
Guo et al.

(10) Patent No.: US 11,456,864 B2
(45) Date of Patent: Sep. 27, 2022

(54) INFORMATION STORAGE METHOD, DEVICE, AND COMPUTER-READABLE STORAGE MEDIUM

(71) Applicant: Tencent Technology (Shenzhen) Company Limited, Shenzhen (CN)

(72) Inventors: Rui Guo, Shenzhen (CN); Maocai Li, Shenzhen (CN); Wenwei Zou, Shenzhen (CN); Jianjun Zhang, Shenzhen (CN); Haitao Tu, Shenzhen (CN); Qi Zhao, Shenzhen (CN); Zongyou Wang, Shenzhen (CN); Jun Liang, Shenzhen (CN); Dawei Zhu, Shenzhen (CN); Binhua Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 667 days.

(21) Appl. No.: 16/355,435

(22) Filed: Mar. 15, 2019

(65) Prior Publication Data
US 2019/0215157 A1     Jul. 11, 2019

Related U.S. Application Data

(63) Continuation of application No. PCT/CN2018/077880, filed on Mar. 2, 2018.

(30) Foreign Application Priority Data

Mar. 3, 2017    (CN) .................... 201710124884.5

(51) Int. Cl.
*H04L 9/00*       (2022.01)
*H04L 9/08*       (2006.01)
(Continued)

(52) U.S. Cl.
CPC .......... *H04L 9/0863* (2013.01); *H04L 9/0618* (2013.01); *H04L 9/0894* (2013.01);
(Continued)

(58) Field of Classification Search
CPC ........................ H04L 9/0863; H04L 9/0618
(Continued)

(56) References Cited

U.S. PATENT DOCUMENTS

| 5,778,395 | A | * | 7/1998 | Whiting | G06F 11/1464 |
| 8,971,539 | B2 | * | 3/2015 | Pandrangi | H04L 9/0894 |
| | | | | | 380/286 |

(Continued)

FOREIGN PATENT DOCUMENTS

| CN | 1541015 A | 10/2004 |
| CN | 103107989 A | 5/2013 |

(Continued)

OTHER PUBLICATIONS

Tencent Technology, ISR, PCT/CN2018/077880, May 2, 2018, 2 pgs.

(Continued)

*Primary Examiner* — Christopher J Brown
(74) *Attorney, Agent, or Firm* — Morgan, Lewis & Bockius LLP

(57) ABSTRACT

The present disclosure discloses an information storage method performed at a server. The method includes: receiving an information storage request sent by a terminal device, the information storage request carrying a first user identifier, an account address, and a to-be-stored ciphertext; performing identity authentication on a user according to a the first user identifier when receiving an information storage request sent by a terminal device, the information storage request carrying the first user identifier, an account address, and a to-be-stored ciphertext; generating a serving (Continued)

end serialization factor according to preset configuration information if after the identity authentication succeeds; obtaining a plurality of ciphertext fragments of the to-be-stored ciphertext according to the serving end serialization factor and the to-be-stored ciphertext; and storing the account address corresponding to the first user identifier, and respectively storing, corresponding to the account address, the plurality of ciphertext fragments into different ciphertext databases.

17 Claims, 11 Drawing Sheets

(51) Int. Cl.
*H04L 9/40* (2022.01)
*H04L 9/06* (2006.01)
*H04L 9/16* (2006.01)
*H04L 9/32* (2006.01)

(52) U.S. Cl.
CPC .............. *H04L 9/16* (2013.01); *H04L 9/3239* (2013.01); *H04L 9/3247* (2013.01); *H04L 9/3249* (2013.01); *H04L 63/0428* (2013.01); *H04L 63/0478* (2013.01); *H04L 63/083* (2013.01); *H04L 63/0876* (2013.01); *H04L 9/50* (2022.05); *H04L 2209/56* (2013.01)

(58) Field of Classification Search
USPC ......................................................... 713/189
See application file for complete search history.

(56) References Cited

U.S. PATENT DOCUMENTS

| | | | |
|---|---|---|---|
| 10,043,017 B2* | 8/2018 | Lewis | H04L 9/14 |
| 10,269,009 B1* | 4/2019 | Winklevoss | G06Q 20/36 |
| 2006/0059363 A1* | 3/2006 | Mese | G06F 21/31 |
| | | | 713/185 |
| 2009/0316885 A1* | 12/2009 | Mahmud | G06F 40/58 |
| | | | 380/28 |
| 2012/0042162 A1 | 2/2012 | Anglin et al. | |
| 2017/0359318 A1* | 12/2017 | Wei | H04L 63/045 |

FOREIGN PATENT DOCUMENTS

| | | |
|---|---|---|
| CN | 103532700 A | 1/2014 |
| CN | 103595793 A | 2/2014 |
| CN | 103795696 A | 5/2014 |
| CN | 103825906 A | 5/2014 |
| CN | 105827411 A | 8/2016 |
| CN | 106230808 A | 12/2016 |
| CN | 106250721 A | 12/2016 |
| CN | 106357640 A | 1/2017 |
| CN | 106686008 A | 5/2017 |
| KR | 20160114749 A | 10/2016 |
| WO | WO 2006086554 A2 | 8/2006 |
| WO | WO 2016154001 A1 | 9/2016 |

OTHER PUBLICATIONS

Tencent Technology, WO, PCT/CN2018/077880, May 2, 2018, 4 pgs.
Tencent Technology, IPRP, PCT/CN2018,077880, Sep. 3, 2019, 5 pgs.

* cited by examiner

INFORMATION STORAGE METHOD, DEVICE, AND COMPUTER-READABLE STORAGE MEDIUM

CROSS-REFERENCE TO RELATED APPLICATIONS

This application is a continuation application of PCT/CN2018/077880, entitled "INFORMATION STORAGE METHOD, DEVICE, AND COMPUTER-READABLE STORAGE MEDIUM" filed on Mar. 2, 2018, which claims priority to China Patent Application No. 201710124884.5, filed with the Chinese Patent Office on Mar. 3, 2017 and entitled "INFORMATION STORAGE METHOD AND APPARATUS, AND COMPUTER READABLE STORAGE MEDIUM", all of which is incorporated herein by reference in their entirety.

FIELD OF THE TECHNOLOGY

The present disclosure relates to the field of information technologies, and in particular, to an information storage method and apparatus, and a computer readable storage medium.

BACKGROUND OF THE DISCLOSURE

With the development of information technologies, as a new technology, the blockchain technology is developed vigorously. A blockchain can be considered as a decentralized shared database including blocks connected in chronological order. Each block stores a hash value associated with a previous block, so that an irreversible strong association exists between blocks in the blockchain. In addition, an identity of shared data that is associated with a transaction process and that is stored in each block is authenticated in a cryptological manner before the shared data is stored. Therefore, the security of transactions and data is ensured. Based on this, the blockchain technology is gradually applied to financial and other fields currently.

In the blockchain technology applied to the financial and other fields, an account address and a private key, in replacement of a username and a password in a conventional application, are used as identity information for data sharing on a blockchain. One account address corresponds to a certain balance. In the process of transferring, by any node, a part of or all the balance of an account address to another account address, a signature needs to be made on original transaction data by using a private key. The original transaction data includes a transfer-out amount and a transfer-in account address. The original transaction data and the signature thereof are broadcast to other nodes in a data sharing system. A system that stores shared data by using the blockchain technology can be referred to as a data sharing system. The data sharing system includes a plurality of nodes. Each node stores all shared data of the data sharing system, and can be considered as a backup for each other. After a specified quantity of nodes verify the signature of the original transaction data successfully, it is determined that a user has the right to transfer the balance in the transfer-out account address, and then the transfer-out amount is transferred into the transfer-in account address, thereby completing the current transaction.

During implementation of the present disclosure, the inventor finds that the related technology at least has the following problems:

A private key is extremely important in the whole transaction process. Once possessing the private key, a user has the right to transfer a balance corresponding to an account address. In actual application, one user can possess a plurality of groups of account addresses and private keys, while account addresses and private keys in the blockchain technology are all irregular character strings. For ease of memorizing, the user generally records the account addresses and private keys into a memo. The memo may be an electronic document or a paper document. If the memo is lost or stolen by others, the account addresses and private keys are prone to leakage, thereby causing property loss of the user. Therefore, in the data sharing system, how to ensure the security of the account addresses and private keys possessed by the user to ensure the property security of the user is a problem to be resolved urgently.

SUMMARY

Embodiments of the present disclosure provide an information storage method and apparatus, and a computer readable storage medium, resolving the problem in the related technology that account addresses and private keys are prone to leakage, which easily causes property loss of a user. The technical solutions are as follows:

According to a first aspect of the present disclosure, an information storage method is provided, the method being applied to a server and including:

receiving an information storage request sent by a terminal device, the information storage request carrying a first user identifier, an account address, and a to-be-stored ciphertext;

performing identity authentication on a user according to the first user identifier;

generating a serving end serialization factor according to preset configuration information after the identity authentication succeeds;

obtaining a plurality of ciphertext fragments of the to-be-stored ciphertext according to the serving end serialization factor and the to-be-stored ciphertext; and storing the account address corresponding to the first user identifier, and respectively storing, corresponding to the account address, the plurality of ciphertext fragments into different ciphertext databases.

According to another aspect of the present disclosure, a server has one or more processors, memory coupled to the one or more processors, and a plurality of program instructions stored in the memory that, when executed by the one or more processors, cause the server to perform the aforementioned information storage method.

According to yet another aspect of the present disclosure, a non-transitory computer readable storage medium stores a plurality of instructions in connection with a server having one or more processors. The plurality of instructions, when executed by the one or more processors, cause the server to perform the aforementioned information storage method.

The technical solutions provided in the embodiments of the present disclosure achieve the following beneficial effects:

A terminal device encrypts a private key by using an encryption password, so that without knowing the encryption password, other users cannot decrypt a ciphertext to obtain the private key. Moreover, in the embodiments of the present disclosure, after the encryption, to-be-stored ciphertext is further stored in a fragmented manner. In this way, after the to-be-stored ciphertext is stolen by other users, the to-be-stored ciphertext cannot be restored even if the other users steal the encryption password of the user. Therefore, the security of identity information for identifying shared data in a data sharing system is improved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions and advantages of the present disclosure clearer, the following describes the implementations of the present disclosure in further detail with reference to the accompanying drawings.

Figure 1A:
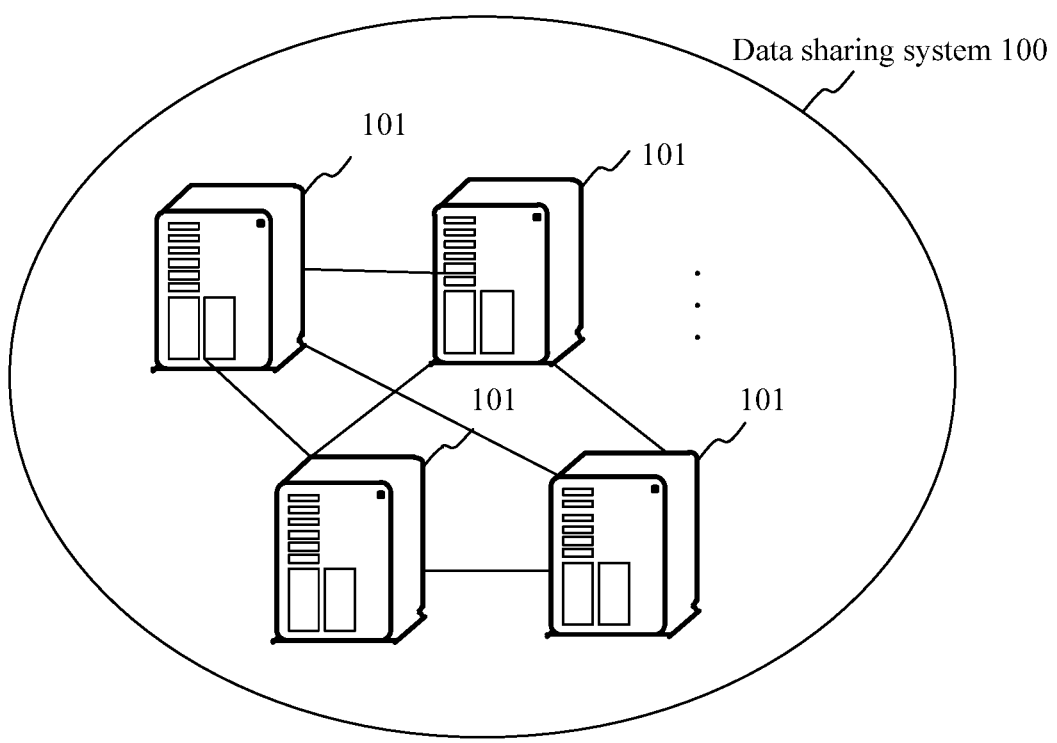
FIG. 1A is a system schematic diagram of a data sharing system according to an embodiment of the present disclosure.

Before detailed explanation of the present disclosure, a data sharing system in this embodiment is described first. As shown in FIG. 1A, a data sharing system 100 includes a plurality of nodes 101. Each node 101 is a computer device in the data sharing system 100. The computer device may be considered as a client or a server. The nodes 101 are configured to store all shared data in the data sharing system 100. The data sharing system 100 is a decentralized system that shares data by using a blockchain technology. That is, the data sharing system 100 has no central node, and all the nodes 101 are equal in status in the data sharing system 100.

Each node 101 stores the same blockchain. The blockchain includes a plurality of blocks, and each block stores different data. Data stored in all the blocks on the blockchain forms all the shared data of the data sharing system 100. Each node 101 stores all the shared data of the data sharing system 100, so that the whole system can run normally as long as any of the nodes 101 in the data sharing system 100 works normally.

The data sharing system 100 based on the blockchain uses an account address and a private key as identity information for data sharing. The data sharing means exchanging data between different account addresses. Shared data is generated in the data exchange process, and the shared data is stored in the blocks of the nodes 101 in the data sharing system 100. Shared data generated in one data exchange process is stored into the blocks after it is determined that the data exchange succeeds.

The data sharing system 100 may be a transaction system, such as a financial transaction system. When the data sharing system 100 is a transaction system, data exchanged between different account addresses is a transfer amount corresponding to the account addresses. Correspondingly, the shared data stored in the nodes 101 is account book data of transactions. A shared data generating process is described in the following by using the transaction system as an example. For example, one node in the data sharing system 100 transfers a transfer amount from an account address A to an account address B. In the transaction process, a signature needs to be made on original transaction data by using a private key corresponding to the account address A. The original transaction data includes the transfer amount and the transfer-in account address. After that, the original transaction data and the signature thereof are broadcast to other nodes in the data sharing system 100. The other nodes verify the signature according to a public key. When a specified quantity of nodes verify the signature in the shared data successfully, it is determined that a user has the right to transfer a balance in the transfer-out account address, and then the transfer amount is transferred into the transfer-in account address, thereby completing the current transaction.

The process of verifying the signature is a zero-knowledge proof process. In the zero-knowledge proof process, a certifier needs to prove to and convince a verifier that the certifier knows or possesses a transfer right of a particular account address, but the certifier cannot leak information about a proven message to the verifier. That is, a transferor does not send private key information to verification nodes, but enables other nodes to perform identity verification by using a private key signature and a public key. Any node 101 in the data sharing system 100 can send information to other nodes by using a locally stored node identifier list. A node identifier of a node 101 may be an IP (short for Internet Protocol, which is a protocol for an interconnection between networks) address or any other type of information capable of identifying the node, which is not limited in this embodiment.

In actual application, one user can possess a plurality of groups of account addresses and private keys. In the blockchain, a public key can be obtained from a private key according to a particular algorithm, and then an account address corresponding to the private key is obtained from the public key. Therefore, as identity authentication information in the data sharing system 100, the private key is extremely important. If the private key is lost, it directly causes property loss of the user. Therefore, to ensure the security of the account addresses and private keys possessed by the user in the data sharing system 100, this embodiment provides an information storage method. For a specific process, refer to the implementation provided in FIG. 2A.

Figure 1B:
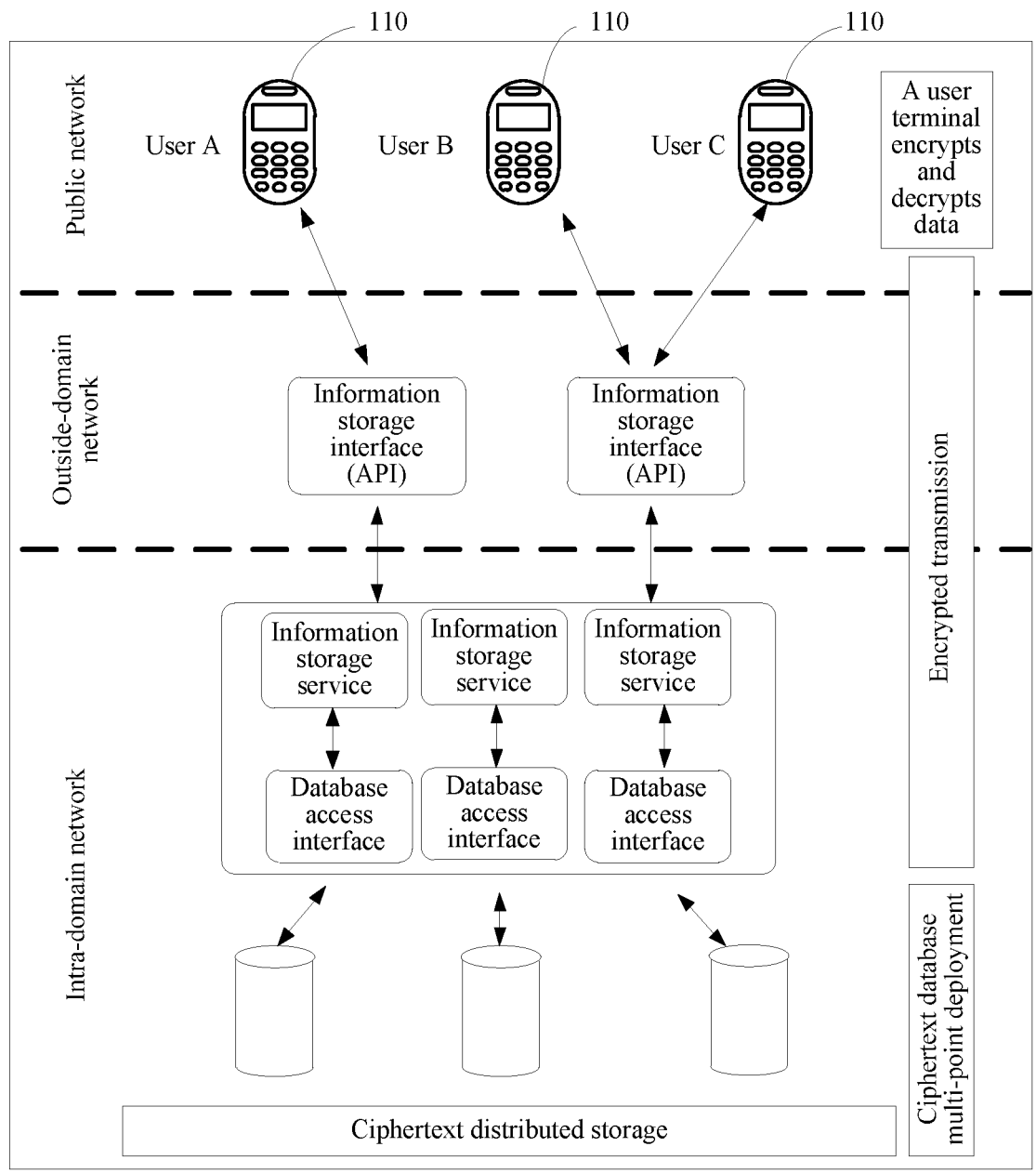
FIG. 1B is an architectural diagram of a system for information storage according to an embodiment of the present disclosure.
Figure 1C:
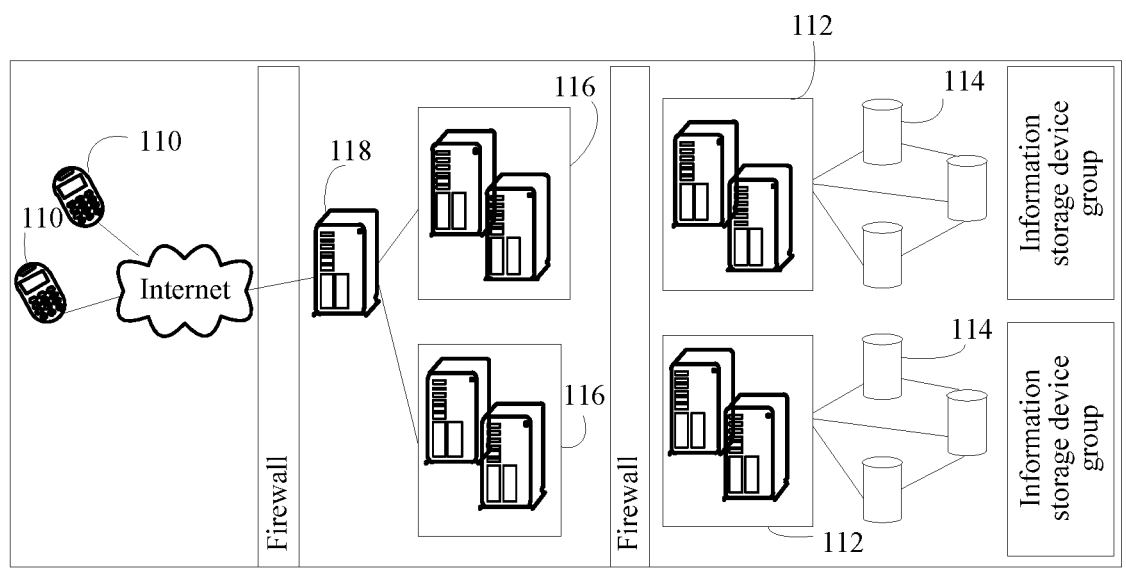
FIG. 1C is an architectural diagram of a system for information storage according to an embodiment of the present disclosure.

FIG. 1B and FIG. 1C are architectural diagrams of a system for information storage according to this embodiment. The system can store account addresses and private keys of the data sharing system securely. In FIG. 1B and FIG. 1C, the architecture of the system for information storage is described from perspectives of a logic level and a device deployment level separately.

According to different access security policies, network types related to the system may include a public network, an outside-domain network, and an intra-domain network. The public network includes terminal devices 110 of users. The terminal devices 110 can access the Internet arbitrarily, and can also access each other.

The outside-domain network serves as a bridge for interaction between intra-domain network devices and public network devices, and gateway devices 116 for connecting the intra-domain network and the public network are disposed in the outside-domain network. During actual application, the gateway devices 116 may be grouped into a plurality of gateway device groups. Different gateway device groups are all connected to a load balance device 118. The load balance device 118 is configured to distribute information storage-related requests of the terminal devices 110 according to system load, so that the requests are respectively forwarded by different gateway device groups to different servers for processing.

At least one server 112 configured to provide an information storage service and at least one storage node configured to store information are disposed in the intra-domain network. Each storage node includes a ciphertext database 114. Different information storage services can be provided by different servers, or can be provided by different storage nodes in one server, which is not limited in this embodiment. Different information storage services may correspond to different storage nodes, and each information storage service is used for storing information in a ciphertext database of a corresponding storage node.

In FIG. 1B, a system logic architecture is represented merely by using information storage services. Configured database access interfaces are used between the information storage services and the ciphertext databases for data storage.

FIG. 1C shows a server deployment manner. Different gateway device groups correspond to different servers, and each server corresponds to a plurality of storage nodes. This deployment manner is referred to as multi-point deployment. In a storage process, data needing to be stored is stored in a fragmented manner by using a serialization factor. For example, to-be-stored data is divided into a plurality of data segments, and the plurality of data segments is respectively stored into different storage nodes after being serialized by using a serialization factor. After a piece of complete data is stored in a fragmented manner, data segments of the data are stored in ciphertext databases of different storage nodes. It can be determined that the data is stored successfully only when storage in all storage nodes corresponding to a server succeeds.

Different data segments obtained after fragmentation may include the same information, but different data segments are not exactly the same. The server may restore a piece of complete data according to some data segments stored in the databases. When one ciphertext database is faulty, content stored in the faulty ciphertext database can be restored through other ciphertext databases, so that data can be synchronized between ciphertext databases when a device is faulty.

Data interaction is performed between the terminal device 110 and the server 112 through a preset information storage interface. A logic function of the information storage interface is implemented on both the terminal device 110 and the server 112.

It should be noted that, data interaction is performed between the terminal device 110 and the gateway device 116 as well as between the gateway device 116 and the server 112 in an encrypted transmission manner, to ensure the security of data transmission. During interaction, the gateway device 116 and the server 112 need to perform identity authentication on each other. For example, an identifier of a server capable of performing data interaction, such as an IP address of the server, may be preconfigured in a gateway device 116. When the gateway device 116 needs to forward data to a server 112 or forward data of a server 112 to a terminal device 110, the data can be forwarded only after a server identifier of the related server is included in the configured server identifier; otherwise, the data is not forwarded. In addition, a gateway identifier of a gateway device 116 capable of performing data interaction may also be configured in a server 112, and the server 112 receives data only when it is determined that data to be received is from the gateway device 116 capable of performing data interaction; otherwise, the data is not received.

Figure 2A:
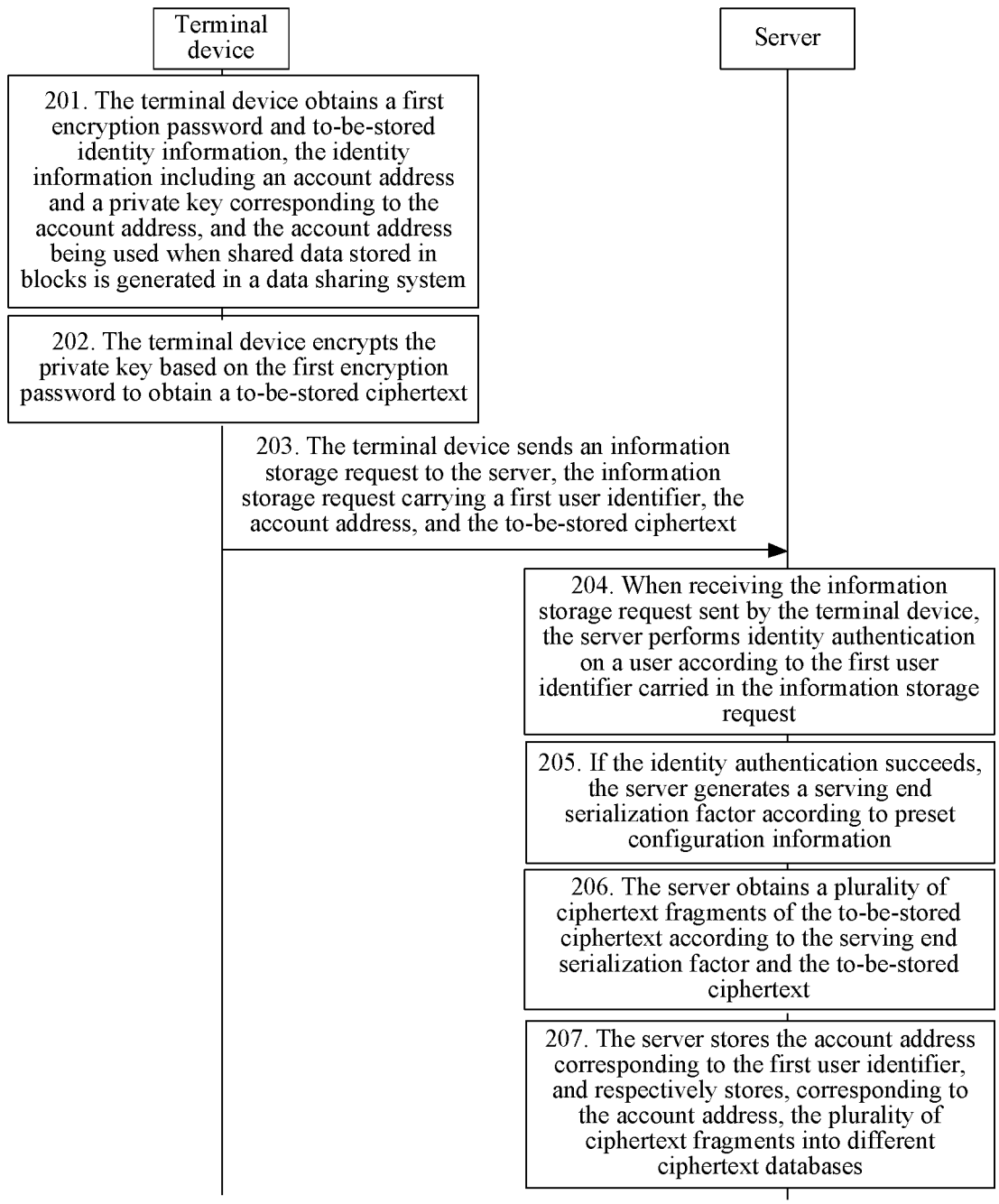
FIG. 2A is a flowchart of an information storage method according to an embodiment of the present disclosure.

FIG. 2A is a flowchart of an information storage method according to an embodiment of the present disclosure. Referring to FIG. 2A, a process of the method provided in this embodiment of the present disclosure includes the following steps:

201. A terminal device obtains a first encryption password and to-be-stored identity information, the identity information including an account address and a private key corresponding to the account address, and the account address being used when shared data stored in blocks is generated in a data sharing system.

An application that provides an information storage function may be installed in the terminal device. A user can store information by using the application, for example, store a plurality of possessed account addresses and a private key corresponding to each account address. When using the application for the first time, the user needs to set a first encryption password for encrypting the private key.

The application may be a non-system application on the terminal device, or may be a system application on the terminal device, which is not limited in this embodiment. Definitely, the storage function may also be one of a plurality of functions in an application. For example, the storage function is an account information storage function or the like provided by a transaction-related application. When the user needs to use the storage function, the terminal device displays an input interface for identity information. The user may input, in the input interface for identity information, a first encryption password, an account address that needs to be stored, and a private key corresponding to the account address, so that the terminal device obtains the identity information that needs to be stored.

In this embodiment, to ensure the security of the first encryption password, the server end does not store the first encryption password in any form, and the terminal device does not exchange the first encryption password with the server. In addition, the terminal device does not store a plaintext of the first encryption password. The user can encrypt the first encryption password by using a set security question and answer and store the encrypted first encryption password in the terminal device locally. In this way, when forgetting the first encryption password, the user can retrieve the first encryption password by using the preset security question.

For example, when the user uses, for the first time, the storage function provided by the terminal device, before or after setting the first encryption password, the user sets the security question by using a security question setting function provided by the terminal device. This process may be as follows: The terminal device obtains at least one security question-answer group according to a security question setting operation of the user; the terminal device encrypts the first encryption password according to the at least one security question-answer group, to obtain a password ciphertext; and the terminal device stores the password ciphertext, so that the user can retrieve the first encryption password according to the at least one security question-answer group.

The terminal device may set at least one security question in advance, and the user sets a corresponding answer according to the at least one security question, and definitely, the security question may also be set by the user manually, which is not limited in this embodiment. After obtaining the at least one security question-answer group specified by the user, the terminal device can encrypt, by using a combination of one or more of the at least one security question-answer group and a preset encryption algorithm, the first encryption password specified by the user. The preset encryption algorithm may be a symmetric encryption algorithm or an asymmetric encryption algorithm, which is not limited in this embodiment.

First, it should be noted that, to ensure the security of the first encryption password, the terminal device deletes buffered information about the first encryption password and buffered information about the security question and answer after encrypting and storing the first encryption password by using the at least one security question-answer group, so that the terminal device does not store any plaintext information about the encryption password and the security question and answer. Therefore, even if the device of the user is stolen, other users cannot obtain the first encryption password of the user without knowing the answer to the security question.

Secondly, it should be noted that, when the user possesses a plurality of groups of account addresses and private keys, the terminal device may store the plurality of groups of account addresses and private keys at one time, or store one group of an account address and a private key each time, which is not limited in this embodiment.

202. The terminal device encrypts the private key based on the first encryption password to obtain a to-be-stored ciphertext.

The process of encrypting, by the terminal device, the private key based on the first encryption password to obtain a to-be-stored ciphertext may be as follows: encrypting the private key according to the first encryption password and a first preset encryption algorithm, to obtain a private key ciphertext; then obtaining signature information of the private key according to a second preset encryption algorithm; and using the private key ciphertext and the signature information of the private key as the to-be-stored ciphertext.

The first preset encryption algorithm may be a symmetric or asymmetric encryption algorithm, such as a Triple Data Encryption Algorithm (3DES), an Advanced Encryption Standard (AES), or an RSA algorithm. The terminal device may set one or more encryption algorithms in advance. The user may select one of the encryption algorithms for encryption as required. It should be noted that, the account address can be derived from the private key according to a specific algorithm; therefore, the terminal device may not encrypt the account address.

The second preset encryption algorithm may be a hash algorithm such as HMAC-SHA256. The second preset encryption algorithm is used for signing and verifying the private key. After the private key ciphertext and the signature information of the private key are obtained, the signature information of the private key can be placed behind the private key ciphertext, thereby obtaining the to-be-stored ciphertext.

203. The terminal device sends an information storage request to a server, the information storage request carrying a first user identifier, the account address, and the to-be-stored ciphertext.

A secure connection may be established between the terminal device and the server. For example, a connection based on a Hyper Text Transfer Protocol over Secure Socket Layer (HTTPS) or Transport Layer Security (TLS) may be established, so as to ensure the security of data transmission.

The first user identifier may be authorization information for authorizing login with a third-party account when the user uses the storage function of the terminal device. The third-party account may be an application account with good secrecy performance. The application account may be an instant messaging application account, an e-commerce application, or the like, which is not limited in this embodiment. For example, when using the storage function, the user needs to authorize login with the third-party account. After a third-party account server confirms authorization, an authorization serial number may be generated according to the third-party account. The authorization serial number is the authorization information for the third-party account, and the authorization serial number can uniquely identify the third-party account. The third-party account server sends the authorization serial number to the terminal device, so that the server providing the information storage service can verify, according to the received first user identifier, the correctness of the first user identifier through the third-party account server. The first user identifier may correspond to a plurality of account addresses.

It should be noted that, to ensure the consistency of encryption manners of ciphertexts corresponding to the same user identifier, before sending the information storage request to the server, the terminal device further needs to verify the first encryption password input by the user. If the verification succeeds, it is determined that the first encryption password is the encryption password specified by the user. Then, step 203 is performed. Definitely, the verification process may also be performed after step 201 and before step 202, which is not limited in this embodiment.

The first encryption password may be verified in the following two password verification manners:

In the first password verification manner, the terminal device requests an encrypted ciphertext from the server to perform password verification.

A password verification process in this manner may be as follows: The terminal device sends a password verification request to the server, the password verification request carrying the first user identifier; the server randomly obtains, according to the received first user identifier, a ciphertext from at least one ciphertext corresponding to the first user identifier, and returns the ciphertext to the terminal device; the terminal device decrypts the received ciphertext by using the first encryption password input by the user, and if the decryption succeeds, it is determined that the first encryption password is the encryption password specified by the user; otherwise, it is determined that the first encryption password is not the encryption password specified by the user, and the terminal device is refused to store information into the server.

It should be noted that, in addition to returning a ciphertext to the terminal device so that the terminal device performs password verification based on the ciphertext, the server can also return a ciphertext fragment to the terminal device according to the first user identifier, so that the terminal device performs password verification based on the ciphertext fragment, which is not limited in this embodiment.

In the second password verification manner, the terminal device performs password verification according to a security question and answer.

A password verification process in this manner may be as follows: The terminal device may display a password verification interface. At least one security question is displayed in the password verification interface. The user needs to input a corresponding answer to the at least one security question. The terminal device decrypts a stored password ciphertext according to the at least one security question and the answer that is input by the user. If the decryption succeeds, it is determined that the obtained first encryption password is the encryption password specified by the user. The first encryption password corresponds to the first user identifier, and the step of storing information into the server is continued. If the decryption fails, it is determined that the obtained first encryption password is not the encryption password specified by the user, and the terminal device refuses to perform the process of storing information into the server.

It should be noted that, the second password verification manner may be applied when the terminal device uploads, to the server for the first time, the account address and the ciphertext corresponding to the first user identifier. That is, at this time, the server has not stored the account address and the ciphertext corresponding to the first user identifier yet. The process of determining, by the terminal device, that the server end does not store the account address and the ciphertext corresponding to the first user identifier may be as follows: The terminal device sends a password verification request to the server, the password verification request carrying the first user identifier; if determining, according to the received first user identifier, that the account address and the ciphertext corresponding to the first user identifier are not stored, the server returns a non-storage message to the terminal device; and after receiving the non-storage message, the terminal device performs the foregoing process of the second password verification manner.

204. When receiving the information storage request sent by the terminal device, the server performs identity authentication on a user according to the first user identifier carried in the information storage request.

In this embodiment, the server providing the information storage service is referred to as a server for short, and a server corresponding to the related third-party account is referred to as a third-party account server.

The process of performing, by the server, identity authentication on a user according to the first user identifier may be as follows: The server sends an identity authentication request to the third-party account server according to information about the first user identifier; if the first user identifier is recorded in the third-party account server, that is, the third-party account server confirms that a user corresponding to the first user identifier authorizes login with a third-party account when the user uses the storage function of the terminal device, the third-party account server returns a verification success message; otherwise, the third-party account server returns a verification failure message.

After receiving the verification success message from the third-party server, the server determines that the identity authentication of the user succeeds; after receiving the verification failure message from the third-party server, the server determines that the identity authentication of the user fails, and sends the verification failure message to the terminal device, to terminate the current information storage process of the terminal device.

In addition, to further ensure the security of the ciphertext corresponding to the account address, after the identity authentication for the terminal device succeeds, the server may further store the obtained to-be-stored ciphertext in a fragmented manner. This process includes the following step 205 to step 207.

205. If the identity authentication succeeds, the server generates a serving end serialization factor according to preset configuration information.

In this embodiment, the server may configure a plurality of storage nodes. Different storage nodes may be deployed on different computer devices, or deployed on the same computer device. Correspondingly, the server in this embodiment may include one computer device or a plurality of computer devices. The server may set configuration information for each storage node in advance, so that each storage node has preset configuration information. The preset configuration information may include configurable information such as a node identifier and storage capacity information of a storage node.

The server may generate a serving end serialization factor corresponding to each storage node according to the preset configuration information of each storage node. Storage nodes with different preset configuration information correspond to different serving end serialization factors. In this case, the serving end serialization factor indicated in step 205 may be considered as a general term for serialization factors corresponding to different storage nodes. Each storage node may be considered as a ciphertext database, and the preset configuration information corresponding to each storage node may be the same or different, which is not limited in this embodiment.

206. The server obtains a plurality of ciphertext fragments of the to-be-stored ciphertext according to the serving end serialization factor and the to-be-stored ciphertext.

After obtaining the to-be-stored ciphertext, the server may divide the to-be-stored ciphertext into a plurality of data segments according to a preset fragmentation algorithm; then, the server respectively serializes the plurality of data segments according to the serving end serialization factors corresponding to the plurality of storage nodes, thereby obtaining a plurality of ciphertext fragments of the to-be-stored ciphertext.

To serialize a data segment means to randomly combine characters included in the data segment with some random characters by using a preset serialization algorithm and the serving end serialization factor, to obtain a corresponding ciphertext fragment.

Data included in the plurality of data segments is subsets of data included in the to-be-stored ciphertext. Different data segments may include the same data, and different data segments are not exactly the same, so that the server can restore the to-be-stored ciphertext according to some of the plurality of data segments. The quantity of the plurality of data segments may be set or modified by the server according to an actual storage requirement. For example, when it is expected that the data can be restored by using two storage nodes in actual application, the quantity of the plurality of data segments is at least three, and correspondingly, the server needs to deploy three storage nodes.

The plurality of ciphertext fragments of the to-be-stored ciphertext is obtained by using the serialization factor. Therefore, it is implemented that serialized encrypted storage is further performed in each ciphertext fragment while the to-be-stored ciphertext is stored in a fragmented manner, thereby further improving the security of information storage.

207. The server stores the account address corresponding to the first user identifier, and respectively stores, corresponding to the account address, the plurality of ciphertext fragments into different ciphertext databases.

In this embodiment, the server stores the user identifier and the account address in a corresponding manner, and may record a storage location of each ciphertext fragment, so that the account address corresponds to the storage location of each ciphertext fragment. Therefore, one ciphertext can be determined uniquely according to a user identifier and an account address. That is, the user identifier and the account address are used as an index of the ciphertext. The respectively storing the plurality of ciphertext fragments into different ciphertext databases means respectively storing the plurality of ciphertext fragments into different storage nodes. The server determines that the plurality of ciphertext fragments is stored successfully only after each storage node determines that the storage succeeds. In this case, the server can return a storage success message to the terminal device.

The foregoing steps 203 to 207 are the process of storing the account address and storing, corresponding to the account address, the to-be-stored ciphertext in a fragmented manner. In this process, the terminal device sends the first user identifier, the account address needing to be stored, and the to-be-stored ciphertext to the server, so that the server stores the account address corresponding to the first user identifier, and stores, corresponding to the account address, the to-be-stored ciphertext in a fragmented manner. The to-be-stored ciphertext is fragmented, and the plurality of data segments obtained through division is serialized separately and then stored into different ciphertext databases. Therefore, even if information in a ciphertext databases is stolen by other users, the other users cannot restore the complete ciphertext, let alone obtain the private key corresponding to the ciphertext, thereby improving the security of information storage.

Figure 2B:
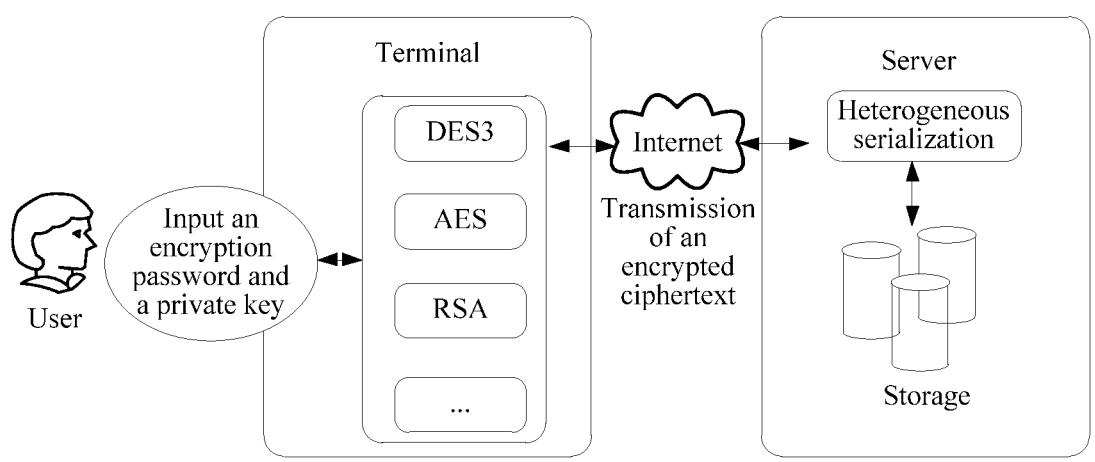
FIG. 2B is a diagram of a data flow of information storage according to an embodiment of the present disclosure.

To further clearly illustrate the process of the foregoing step 201 to step 207, a diagram of a data flow corresponding to the process is shown in FIG. 2B. Serialization means serializing the ciphertext by using the serving end serialization factor. The account address and the ciphertext are stored at the server end, so that a legal user can access, by using any device, the account address and the ciphertext stored at the server end. Therefore, cloud storage of information is implemented while the storage security is improved.

In another implementation, the terminal device may also store the account address and the to-be-stored ciphertext locally, to implement information storage based on the terminal device, so that stored information is insulated from a network and other users cannot steal, through a network approach, information stored in the terminal device locally, thereby improving the security of information storage. Correspondingly, the information storage method in this embodiment may further include the following step a1 to step a3 after step 202:

Step a1: The terminal device generates a client serialization factor according to device identifier information of the local terminal.

The terminal device may perform step a1 after the user selects to store the account address and the to-be-stored ciphertext locally. Definitely, the terminal device may also perform step a1 by default after obtaining the account address and the to-be-stored ciphertext, so as to store the account address and the to-be-stored ciphertext locally. The processes of storing the account address and the to-be-stored ciphertext locally and storing the account address and the to-be-stored ciphertext into the server may be performed at the same time or separately, which is not limited in this embodiment.

Step a2: The terminal device obtains, according to the client serialization factor and the to-be-stored ciphertext, a plurality of ciphertext fragments of the to-be-stored ciphertext.

The terminal device may divide the to-be-stored ciphertext into a plurality of data segments according to a preset fragmentation algorithm; and the terminal device serializes the plurality of data segments separately according to the client serialization factor, to obtain a plurality of ciphertext fragments of the to-be-stored ciphertext.

Step a3: Respectively store the plurality of ciphertext fragments into different local ciphertext databases, and establish a correspondence between the account address and the plurality of ciphertext fragments.

The terminal device may record a storage location of each ciphertext fragment, and establish a correspondence between the account address and the storage location of each ciphertext fragment. Different ciphertext fragments may be stored into different magnetic disk partitions of the terminal device, or stored at different locations of the same magnetic disk partition, so that the plurality of stored ciphertext fragments is out-of-order. Therefore, the security of information storage is further ensured while the first encryption password is encrypted.

It should be noted that, when the terminal device stores the account address and the to-be-stored ciphertext, the user may specify a corresponding storage directory and a filename. Different terminal devices have different device identifier information, and client serialization factors corresponding to different terminal devices are usually different as well. Therefore, even if information stored in a terminal device is stolen by other users, the other users cannot obtain specific content of the information by using other terminal devices. Moreover, the terminal device does not store the client serialization factor locally. The client serialization factor is data generated by the terminal device in the process of obtaining a plurality of ciphertext segments of the to-be-stored ciphertext. Moreover, even if the client serialization factor is buffered in the foregoing process of obtaining the plurality of ciphertext fragments, the terminal device also clears the buffered client serialization factor after obtaining the plurality of ciphertext fragments of the to-be-stored ciphertext, to ensure that other users cannot obtain the client serialization factor, thereby ensuring the security of local information storage.

It should be noted that, before performing step a1 to step a3, the terminal device may also perform password verification in a manner similar to the foregoing two password verification manners. The difference between the foregoing two manners only lies in that, in the foregoing first password verification manner, the terminal device obtains a ciphertext randomly from the local ciphertext database, and in the foregoing second password verification manner, the terminal device performs the process of the foregoing second password verification manner after determining that the account address and the corresponding ciphertext are not stored locally. For the similar password verification process, details are not described herein again.

Figure 2C:
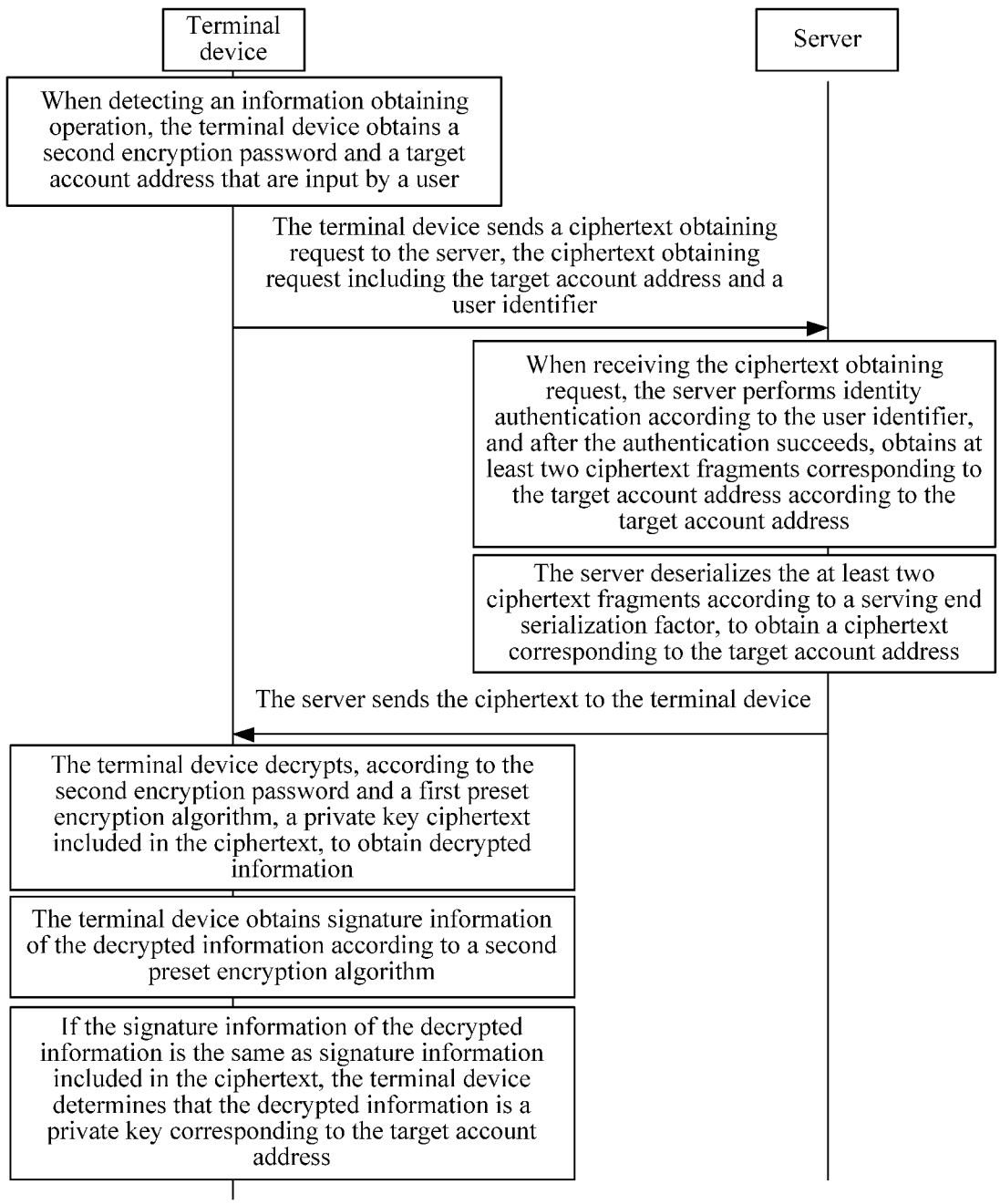
FIG. 2C is a flowchart of obtaining a ciphertext according to an embodiment of the present disclosure.

In this embodiment, after the user stores the account address and the corresponding ciphertext into the ciphertext database, when data exchange needs to be performed in the data sharing system, the terminal device can obtain, from the ciphertext database, a ciphertext corresponding to an account address that needs to exchange data, and obtains a private key corresponding to the account address after decrypting the ciphertext. Therefore, the terminal device can sign exchanged data by using the private key, so as to perform a subsequent data exchange process. The process of obtaining, by the terminal device, the ciphertext corresponding to the account address may include the following step b1 to step b5. To illustrate the process more clearly, FIG. 2C shows a process of obtaining, by the terminal device, the ciphertext from the server.

Step b1: When detecting an information obtaining operation, the terminal device obtains a second encryption password and a target account address that are input by a user.

Step b2: The terminal device obtains a ciphertext corresponding to the target account address after verifying that the second encryption password is consistent with an encryption password specified by the user.

The process of verifying, by the terminal device, whether the second encryption password is consistent with an encryption password specified by the user is similar to the foregoing two password verification processes, and details are not described herein again.

The terminal device may obtain the ciphertext corresponding to the target account address in the following two manners:

In the first manner, the terminal device obtains, from a local ciphertext database, the ciphertext corresponding to the target account address.

When the terminal device stores account addresses and corresponding ciphertexts locally, the terminal device may obtain, from the ciphertext database, a ciphertext corresponding to the target account address according to the target account address. It should be noted that, some account addresses and ciphertexts may not be stored in the terminal device but are stored at the server end. Therefore, when it is found through query that the ciphertext corresponding to the target account address does not exist in the local ciphertext database, the terminal device may obtain the ciphertext corresponding to the target account address from the server in the following second manner.

In the second manner, the terminal device obtains the ciphertext corresponding to the target account address from the server.

In this manner, the process of obtaining, by the terminal device, the ciphertext corresponding to the target account address may be as follows: The terminal device sends a ciphertext obtaining request to the server, the ciphertext obtaining request including the target account address; when receiving the ciphertext obtaining request, the server obtains, according to the target account address, at least two ciphertext fragments corresponding to the target account address; and the server deserializes the at least two ciphertext fragments according to the serving end serialization factor, to obtain the ciphertext corresponding to the target account address, and sends the ciphertext to the terminal device.

In order to improve the efficiency of obtaining, by the server, the ciphertext corresponding to the target account address, the ciphertext obtaining request may further carry a user identifier, so that the server can query in a range of account addresses and ciphertexts corresponding to the user identifier. It should be noted that, when receiving the ciphertext obtaining request, the server may perform identity authentication by using the user identifier, and perform the step of obtaining at least two ciphertext fragments corresponding to the target account address after the identity authentication succeeds; otherwise, the server returns an identity authentication failure message, and terminates the ciphertext obtaining process. The identity authentication process is similar to the identity authentication process in step 204, and details are not described herein again.

The process of deserializing, by the server, the at least two ciphertext fragments according to the serving end serialization factor, to obtain the ciphertext corresponding to the target account address may be as follows: The server obtains, according to storage locations of a plurality of ciphertext fragments corresponding to the target address, the at least two ciphertext fragments from at least two of a plurality of storage nodes; for each of the at least two storage nodes, the server generates a serving end serialization factor of the storage node according to configuration information of the storage node, and deserializes a ciphertext fragment corresponding to the storage node according to the serving end serialization factor. After the at least two ciphertext fragments are all deserialized, the ciphertext corresponding to the target account is obtained.

Step b3: The terminal device decrypts, according to the second encryption password and the first preset encryption algorithm, a private key ciphertext included in the ciphertext, to obtain decrypted information.

Step b4: The terminal device obtains signature information of the decrypted information according to the second preset encryption algorithm.

Step b5: The terminal device determines that the decrypted information is a private key corresponding to the target account address if the signature information of the decrypted information is the same as signature information included in the ciphertext.

Figure 2D:
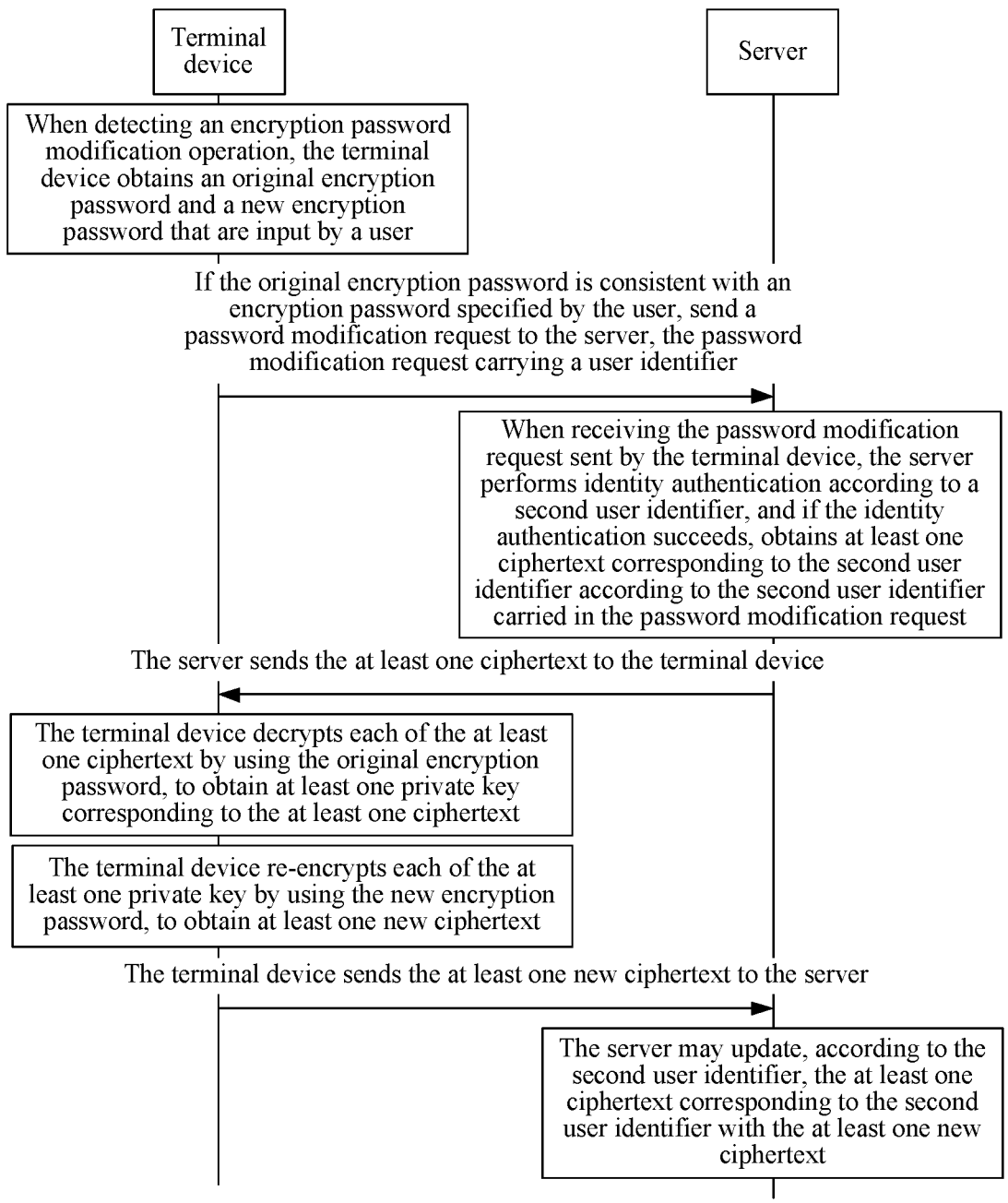
FIG. 2D is a flowchart of encryption password modification according to an embodiment of the present disclosure.

In this embodiment, the user may further modify the encryption password. When the server stores the account address of the user and the corresponding ciphertext, the process may include the following step c1 to step c7. To illustrate the process more clearly, FIG. 2D shows a process of exchanging a modified password between the terminal device and the server.

Step c1: When detecting an encryption password modification operation, the terminal device obtains an original encryption password and a new encryption password that are input by a user Step c2: If the original encryption password is consistent with an encryption password specified by the user, the terminal device obtains at least one ciphertext encrypted by using the original encryption password.

The terminal device can verify whether the original encryption password is consistent with the password specified by the user. The verification process is similar to the foregoing two password verification manners, and details are not described herein again.

The terminal device may obtain, in the following two manners, at least one ciphertext encrypted by using the original encryption password. The at least one ciphertext is all ciphertexts encrypted by using the original encryption password.

In the first manner, the terminal device obtains the at least one ciphertext from the server.

In this manner, the process of obtaining, by the terminal device, the at least one ciphertext may be as follows: The terminal device sends a password modification request to the server, the password modification request carrying a user identifier; when receiving the password modification request sent by the terminal device, the server obtains, according to a second user identifier carried in the password modification request, at least one ciphertext corresponding to the second user identifier, the at least one ciphertext corresponding to the second user identifier being the at least one ciphertext encrypted by using the original encryption password; after that, the server sends the at least one ciphertext to the terminal device.

It should be noted that, in the process of obtaining, by the server, the at least one ciphertext corresponding to the second user identifier, the server deserializes a plurality of ciphertext fragments corresponding to each account address, thereby obtaining a ciphertext corresponding to each account address. The deserialization process is similar to the process of deserializing, by the server, the ciphertext fragments when the terminal device obtains the ciphertext corresponding to the target account address from the server in step b2, and details are not described herein again.

It should be noted that, when receiving the ciphertext obtaining request, the server may further perform identity authentication on the user by using the second user identifier, and after the identity authentication succeeds, the server performs the step of obtaining the at least one ciphertext corresponding to the second user identifier; otherwise, the server returns an identity authentication failure message, to terminate the encryption password modification process. The identity authentication process for the user is similar to the identity authentication process in step 204, and details are not described herein again.

In the second manner, the terminal device obtains the at least one ciphertext locally.

The terminal device may obtain at least one stored account address and at least one corresponding ciphertext from the local ciphertext database. For the ciphertext corresponding to each account address, the terminal device generates a client serialization factor according to local device identifier information, and deserializes a plurality of ciphertext fragments corresponding to the account address by using the client serialization factor, to obtain the ciphertext corresponding to the account address.

Step c5: The terminal device decrypts each of the at least one ciphertext by using the original encryption password, to obtain at least one private key corresponding to at least one ciphertext.

For each ciphertext, the process of decrypting the ciphertext by the terminal device is similar to the foregoing steps b3 to b5, and details are not described herein again.

Step c6: The terminal device re-encrypts each of the at least one private key by using a new encryption password to obtain at least one new ciphertext, and stores the at least one new ciphertext according to at least one account address corresponding to the at least one ciphertext.

For each private key, the process of encrypting the private key by the terminal device is similar to step 202, and details are not described herein again.

The at least one new ciphertext may be stored in the following two manners.

In the first manner, the terminal device sends the at least one new ciphertext to the server, so that the at least one new ciphertext is stored in the server.

In this manner, the server may update, according to the second user identifier, the at least one ciphertext corresponding to the second user identifier with the at least one new ciphertext. For example, in step c2, the at least one ciphertext sent by the server to the terminal device may follow a particular sequence, and the sequence is used for identifying a sequence of at least one account address corresponding to the at least one ciphertext. The terminal device may also return, according to the same sequence, the at least one new ciphertext corresponding to the at least one ciphertext, so that the server can store, corresponding to the at least one account address, the at least one new ciphertext in a fragmented manner according to the sequence.

In the second manner, the terminal device stores the at least one new ciphertext locally.

In step c2, the at least one ciphertext obtained by the terminal device may follow a particular sequence, and the sequence is used for identifying a sequence of at least one account address corresponding to the at least one ciphertext. Based on the sequence, the terminal device may store, corresponding to the at least one account address, the at least one new ciphertext in a fragmented manner. The fragmented storage process is similar to step a1 to step a3, and details are not described herein again.

In addition, the user may also perform operations, such as deletion or modification, on the stored account address and ciphertext. In this embodiment, the terminal device further provides an information storage log query function. For example, the terminal device may record logs of the user using the information storage function, for example, an information storage log, an information reading log, an information deletion log, and a password modification log. The recorded logs include an IP address of the terminal device and user behavior information. The user behavior information may be related information such as information storage, information reading, information deletion, and password modification.

Figure 2E:
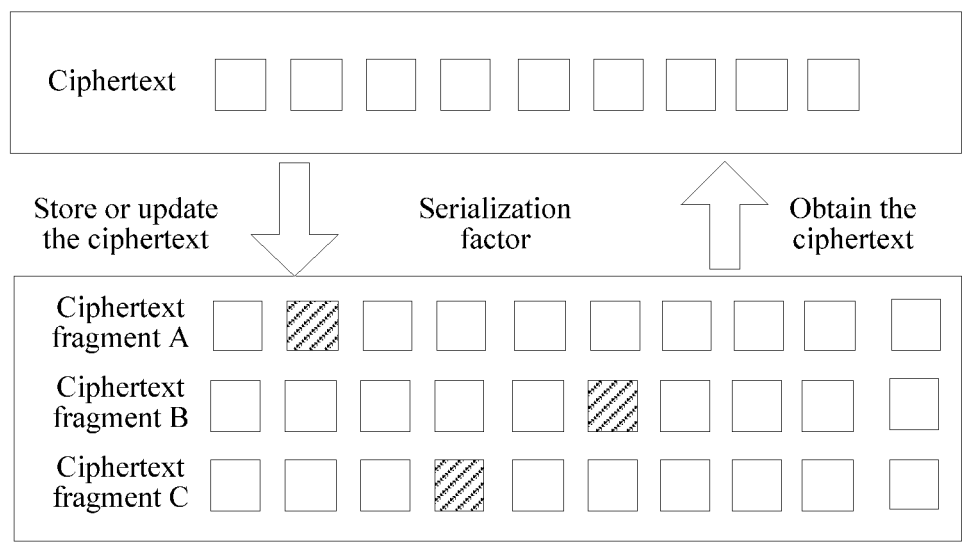
FIG. 2E is a principle schematic diagram of fragmented storage according to an embodiment of the present disclosure.

To illustrate the process of storing a ciphertext in a fragmented manner by means of serialization more clearly, FIG. 2E is a schematic diagram of serialization and deserialization of a ciphertext by using a serialization factor. The serialization factor may be a serving end serialization factor or a client serialization factor. In FIG. 2E, the ciphertext includes a plurality of characters, and each grid in FIG. 2E represents a character. The ciphertext A is stored as three ciphertext fragments, which are a ciphertext fragment A, a ciphertext fragment B, and a ciphertext fragment C respectively. Grids filled with oblique lines in the ciphertext fragments are redundant characters filled in the serialization process.

Figure 2F:
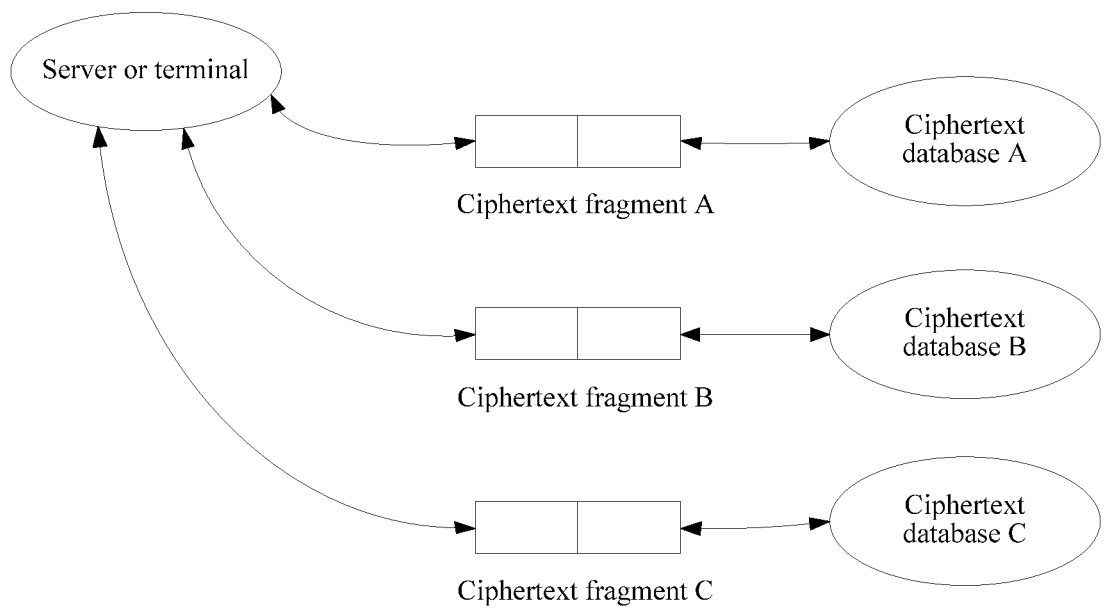
FIG. 2F is a principle schematic diagram of fragmented storage according to an embodiment of the present disclosure.

FIG. 2F is a schematic diagram of storing, by a server or a terminal device, ciphertext fragments corresponding to a ciphertext into different ciphertext databases. FIG. 2F shows an example in which the ciphertext fragment A is stored into a ciphertext database A, the ciphertext fragment B is stored into a ciphertext database B, and the ciphertext fragment C is stored into a ciphertext database C. Definitely, after the ciphertext fragments are stored, the corresponding ciphertext fragments may further be read from the ciphertext databases.

In the method provided in this embodiment, the terminal device encrypts a private key by using an encryption password, so that other users cannot decrypt a ciphertext to obtain the private key without knowing the encryption password. Moreover, after the encryption, in this embodiment of the present disclosure, a to-be-stored ciphertext is further stored in a fragmented manner, so that after the to-be-stored ciphertext is stolen by other users, the to-be-stored ciphertext cannot be restored even if the other users steal the encryption password of the user. Therefore, the security of identity information for identifying shared data in a data sharing system is improved.

Figure 3:
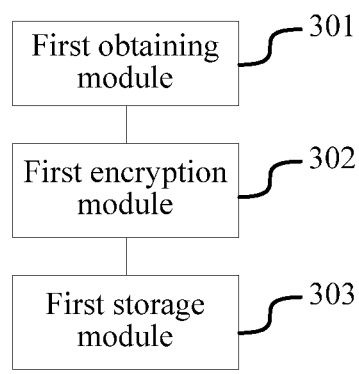
FIG. 3 is a block diagram of an information storage apparatus according to an embodiment of the present disclosure.

FIG. 3 is a block diagram of an information storage apparatus according to an embodiment of the present disclosure. Referring to FIG. 3, the apparatus includes a first obtaining module 301, a first encryption module 302, and a first storage module 303.

The first obtaining module 301 is connected to the first encryption module 302, and is configured to obtain a first encryption password and to-be-stored identity information, the identity information including an account address and a private key corresponding to the account address, and the account address being used when shared data stored in blocks is generated in a data sharing system. The first encryption module 302 is connected to the first storage module 303, and is configured to encrypt the private key based on the first encryption password to obtain a to-be-stored ciphertext. The first storage module 303 is configured to store the account address, and store, corresponding to the account address, the to-be-stored ciphertext in a fragmented manner.

In a possible implementation, the first storage module is configured to send an information storage request to a server, the information storage request carrying a first user identifier, the account address, and the to-be-stored ciphertext, so that the server stores, corresponding to the first user identifier and the account address, the to-be-stored ciphertext in a fragmented manner.

In a possible implementation, the first storage module is configured to generate a client serialization factor according to device identifier information of a local terminal device; perform fragmentation according to the client serialization factor and the to-be-stored ciphertext, and obtain a plurality of ciphertext fragments of the to-be-stored ciphertext; and respectively store the plurality of ciphertext fragments into different local ciphertext databases, and establish a correspondence between the account address and the plurality of ciphertext fragments.

In a possible implementation, the first encryption module is configured to encrypt the private key according to the first encryption password and a first preset encryption algorithm, to obtain a private key ciphertext; obtain signature information of the private key according to a second preset encryption algorithm; and use the private key ciphertext and the signature information of the private key as the to-be-stored ciphertext.

In a possible implementation, the apparatus further includes:

a second obtaining module, configured to obtain, when an information obtaining operation is detected, a second encryption password and a target account address that are input by a user;

a third obtaining module, configured to obtain a ciphertext corresponding to the target account address if the second encryption password is consistent with an encryption password specified by the user;

a first decryption module, configured to decrypt, according to the second encryption password and the first preset encryption algorithm, a private key ciphertext included in the ciphertext, to obtain decrypted information;

a fourth obtaining module, configured to obtain signature information of the decrypted information according to the second preset encryption algorithm; and a determining module, configured to determine that the decrypted information is a private key corresponding to the target account address if the signature information of the decrypted information is the same as the signature information included in the ciphertext.

In a possible implementation, the apparatus further includes:

a fifth obtaining module, configured to obtain at least one security question-answer group according to a security question setting operation of a user;

a second encryption module, configured to encrypt the first encryption password according to the at least one security question-answer group, to obtain a password ciphertext; and a second storage module, configured to store the password ciphertext, so that the user can retrieve the first encryption password according to the at least one security question-answer group.

In a possible implementation, the apparatus further includes:

a sixth obtaining module, configured to obtain, when an encryption password modification operation is detected, an original encryption password and a new encryption password that are input by a user;

a seventh obtaining module, configured to obtain, if the original encryption password is consistent with an encryption password specified by the user, at least one ciphertext encrypted by using the original encryption password;

a second decryption module, configured to decrypt each of the at least one ciphertext by using the original encryption password, to obtain at least one private key corresponding to the at least one ciphertext;

where the first encryption module is further configured to re-encrypt each of the at least one private key by using the new encryption password, to obtain at least one new ciphertext corresponding to the at least one private key; and a sending module, configured to send the at least one new ciphertext to the server, so that the server replaces the at least one ciphertext corresponding to the first user identifier with the at least one new ciphertext.

The apparatus provided in this embodiment of the present disclosure encrypts a private key by using an encryption password, so that other users cannot decrypt a ciphertext to obtain the private key without knowing the encryption password. Moreover, after encryption, in this embodiment of the present disclosure, a to-be-stored ciphertext is further stored in a fragmented manner, so that after the to-be-stored ciphertext is stolen by other users, the to-be-stored ciphertext cannot be restored even if the other users steal the encryption password of the user. Therefore, the security of identity information for identifying shared data in a data sharing system is improved.

Figure 4:
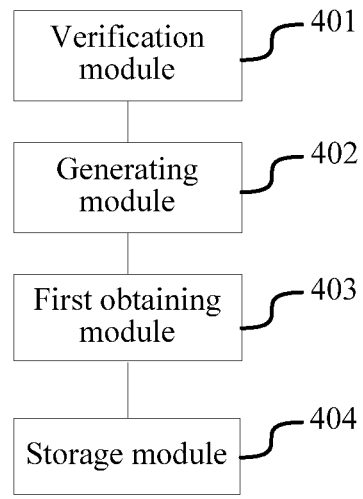
FIG. 4 is a block diagram of an information storage apparatus according to an embodiment of the present disclosure.

FIG. 4 is a block diagram of an information storage apparatus according to an embodiment of the present disclosure. Referring to FIG. 4, the apparatus includes an authentication module 401, a generating module 402, a first obtaining module 403, and a storage module 404.

The authentication module 401 is connected to the generating module 402 and is configured to perform identity authentication on a user according to a first user identifier when receiving an information storage request sent by a terminal device, the information storage request carrying the first user identifier, an account address, and a to-be-stored ciphertext. The generating module 402 is connected to the first obtaining module 403 and is configured to generate a serving end serialization factor according to preset configuration information if the identity authentication succeeds.

The first obtaining module 403 is connected to the storage module 404 and is configured to obtain a plurality of ciphertext fragments of the to-be-stored ciphertext according to the serving end serialization factor and the to-be-stored ciphertext. The storage module 404 is configured to store the account address corresponding to the first user identifier, and respectively store, corresponding to the account address, the plurality of ciphertext fragments into different ciphertext databases.

In a possible implementation, the apparatus further includes:

a second obtaining module, configured to obtain, according to a target account address, a plurality of ciphertext fragments corresponding to the target account address when receiving a ciphertext obtaining request sent by the terminal device, the ciphertext obtaining request carrying the target account address;

a deserialization module, configured to deserialize the plurality of ciphertext fragments according to the serving end serialization factor, to obtain a ciphertext corresponding to the target account address; and a sending module, configured to send the ciphertext to the terminal device, so that the terminal device decrypts the ciphertext according to a second encryption password that is input by the user, to obtain a private key corresponding to the ciphertext.

In a possible implementation, the apparatus further includes:

a third obtaining module, configured to obtain, when receiving a password modification request sent by the terminal device and according to a second user identifier carried in the password modification request, at least one ciphertext corresponding to the second user identifier;

where the sending module is further configured to send the at least one ciphertext to the terminal device, so that the terminal device decrypts the at least one ciphertext according to an original encryption password that is input by the user, re-encrypts, according to a new encryption password that is input by the user, at least one private key obtained after the decryption, and returns at least one new ciphertext obtained after the re-encryption; and an updating module, configured to update, according to the second user identifier, the at least one ciphertext corresponding to the second user identifier with the at least one new ciphertext.

The apparatus provided in this embodiment of the present disclosure encrypts a private key by using an encryption password, so that other users cannot decrypt a ciphertext to obtain the private key without knowing the encryption password. Moreover, after encryption, in this embodiment of the present disclosure, a to-be-stored ciphertext is further stored in a fragmented manner, so that after the to-be-stored ciphertext is stolen by other users, the to-be-stored ciphertext cannot be restored even if the other users steal the encryption password of the user. Therefore, the security of identity information for identifying shared data in a data sharing system is improved.

It should be noted that, when the information storage apparatus provided in the foregoing embodiment stores information, the division of the foregoing functional modules is merely used as an example for description. In actual application, the foregoing functions may be assigned to and completed by different functional modules as required. That is, an internal structural division of the device may be divided into different functional modules to complete all or some of the functions described above. In addition, the information storage apparatus provided in the foregoing embodiment belongs to the same conception as the embodiment of the information storage method. For a specific implementation process thereof, refer to the method embodiment. Details are not described herein again.

Figure 5:
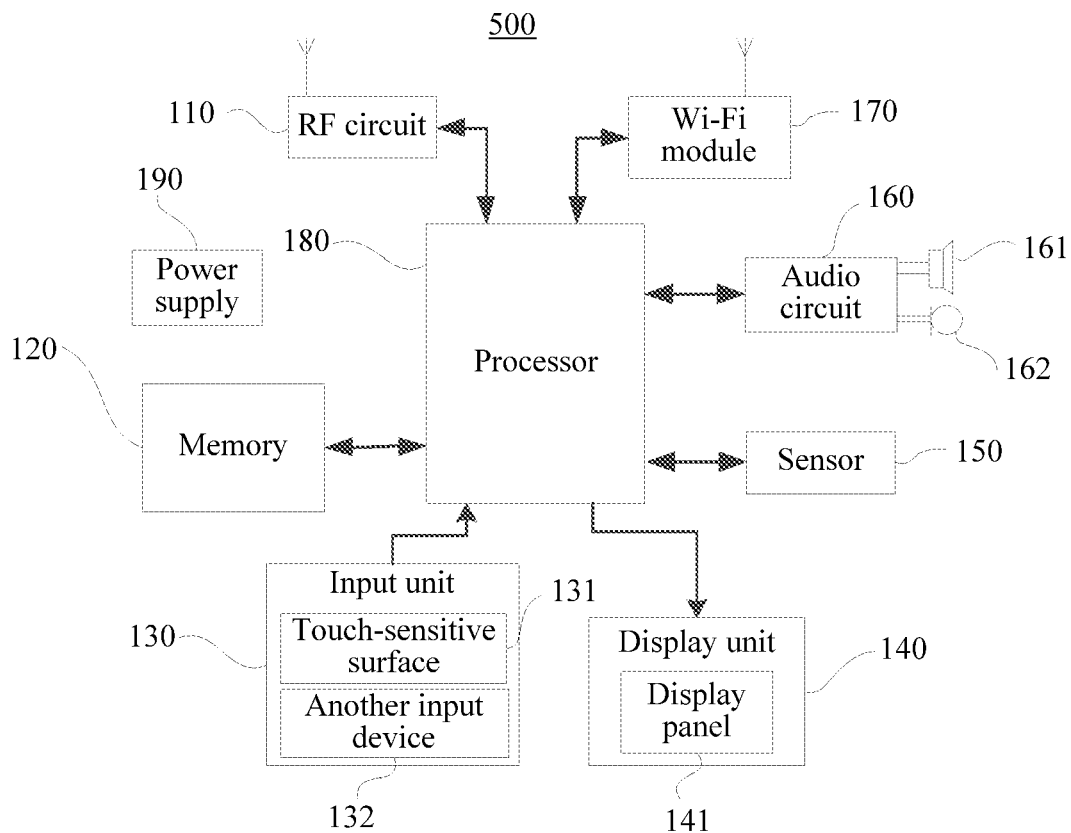
FIG. 5 is a schematic structural diagram of a terminal device according to an embodiment of the present disclosure.

FIG. 5 is a schematic structural diagram of a terminal device according to an embodiment of the present disclosure. The terminal device may be configured to perform the information storage methods in the foregoing embodiments. Referring to FIG. 5, the terminal device 500 includes:

The terminal device 500 may include components such as a radio frequency (RF) circuit 110, a memory 120 including one or more computer readable storage media, an input unit 130, a display unit 140, a sensor 150, an audio circuit 160, a Wireless Fidelity (Wi-Fi) module 170, a processor 180 including one or more processing cores, and a power supply 190. A person skilled in the art may understand that the structure of the terminal device shown in FIG. 5 does not constitute a limitation to the terminal device, and the terminal device may include more components or fewer components than those shown in the figure, or some components may be combined, or a different component deployment may be used.

The RF circuit 110 may be configured to receive and send a signal during an information receiving and sending process or a conversation process. Specifically, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device by wireless communication. The wireless communication may use any communications standard or protocol, which includes, but is not limited to, a Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal device 500, and the like. In addition, the memory 120 may include a high speed random access memory, and may also include a non-volatile memory, such as at least one magnetic disk storage device, a flash memory device, or another volatile solid storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touchscreen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface acoustic wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal device 500. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal device 500 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal device 500 is moved to the ear. As one type of motion sensor, a gravity acceleration sensor may detect the magnitude of accelerations in various directions (which generally are three axes), may detect the magnitude and a direction of the gravity when static, and may be configured to identify an application of a mobile phone posture (such as switchover between horizontal and vertical screens, a related game, and posture calibration of a magnetometer), a vibration identification-related function (such as a pedometer and a knock). Other sensors, such as a gyroscope, a barometer, a hygrometer, a thermometer, and an infrared sensor, which may be configured in the terminal device 500 are not further described in detail herein.

The audio circuit 160, a speaker 161, and a microphone 162 may provide audio interfaces between the user and the terminal device 500. The audio circuit 160 may transmit, to the speaker 161, an electric signal converted from received audio data. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal device 500.

Wi-Fi is a short distance wireless transmission technology. The terminal device 500 may help, by using the Wi-Fi module 170, a user to receive and send an email, browse a web page, access stream media, and the like, which provides wireless broadband Internet access for the user. Although FIG. 5 shows the Wi-Fi module 170, it may be understood that, the Wi-Fi module is not a necessary component of the terminal device 500, and can be omitted according to demands without changing the scope of the essence of the present invention.

The processor 180 is a control center of the terminal device 500, and connects to various parts of the terminal device by using various interfaces and lines. By running or executing the software program and/or module stored in the memory 120, and invoking data stored in the memory 120, the processor 180 performs various functions and data processing of the terminal device 500, thereby performing overall monitoring on the terminal device. Optionally, the processor 180 may include one or more processing cores. Optionally, the processor 180 may integrate an application processor and a modem processor. The application processor mainly processes an operating system, a user interface, an application program, and the like. The modem processor mainly processes wireless communication. It may be understood that, the foregoing modem processor may not be integrated into the processor 180.

Optionally, the processor 180 loads at least one instruction stored in the memory 120 and performs the following operations:

obtaining a first encryption password and to-be-stored identity information, the identity information including an account address and a private key corresponding to the account address, and the account address being used when shared data stored in blocks is generated in a data sharing system;

encrypting the private key based on the first encryption password to obtain a to-be-stored ciphertext; and storing the account address, and storing, corresponding to the account address, the to-be-stored ciphertext in a fragmented manner.

The processor may further load the at least one instruction to perform the following operation:

sending an information storage request to a server, the information storage request carrying a first user identifier, the account address, and the to-be-stored ciphertext, so that the server stores, corresponding to the first user identifier and the account address, the to-be-stored ciphertext in a fragmented manner.

The processor may further load the at least one instruction to perform the following operations:

generating a client serialization factor according to device identifier information of a local terminal device;

performing fragmentation according to the client serialization factor and the to-be-stored ciphertext, and obtaining a plurality of ciphertext fragments of the to-be-stored ciphertext; and respectively storing the plurality of ciphertext fragments into different local ciphertext databases, and establishing a correspondence between the account address and the plurality of ciphertext fragments.

The processor may further load the at least one instruction to perform the following operations:

encrypting the private key according to the first encryption password and a first preset encryption algorithm, to obtain a private key ciphertext;

obtaining signature information of the private key according to a second preset encryption algorithm; and using the private key ciphertext and the signature information of the private key as the to-be-stored ciphertext.

The processor may further load the at least one instruction to perform the following operations:

obtaining, when an information obtaining operation is detected, a second encryption password and a target account address that are input by a user;

obtaining a ciphertext corresponding to the target account address if the second encryption password is consistent with an encryption password specified by the user;

decrypting, according to the second encryption password and the first preset encryption algorithm, a private key ciphertext included in the ciphertext, to obtain decrypted information;

obtaining signature information of the decrypted information according to the second preset encryption algorithm; and determining that the decrypted information is a private key corresponding to the target account address if the signature information of the decrypted information is the same as signature information comprised in the ciphertext.

The processor may further load the at least one instruction to perform the following operations:

obtaining at least one security question-answer group according to a security question setting operation of a user;

encrypting the first encryption password according to the at least one security question-answer group, to obtain a password ciphertext; and storing the password ciphertext, so that the user can retrieve the first encryption password according to the at least one security question-answer group.

The processor may further load the at least one instruction to perform the following operations:

obtaining, when an encryption password modification operation is detected, an original encryption password and a new encryption password that are input by a user;

obtaining, if the original encryption password is consistent with an encryption password specified by the user, at least one ciphertext encrypted by using the original encryption password;

decrypting each of the at least one ciphertext by using the original encryption password, to obtain at least one private key corresponding to the at least one ciphertext;

re-encrypting each of the at least one private key by using the new encryption password, to obtain at least one new ciphertext corresponding to the at least one private key; and sending the at least one new ciphertext to the server, so that the server replaces the at least one ciphertext corresponding to the first user identifier with the at least one new ciphertext.

The terminal device 500 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal device 500 may further include a camera, a Bluetooth module, and the like, which are not further described herein. Specifically, in this embodiment, the display unit of the terminal device is a touchscreen display, and the terminal device further includes a memory and one or more programs. The one or more programs are stored in the memory and configured to be executed by one or more processors. The one or more programs include executable instructions. The terminal device 500 is configured to execute the instructions, so as to perform the method performed by the terminal device in the foregoing embodiment of the information storage method.

In an exemplary embodiment, a non-volatile computer readable storage medium including instructions, such as a memory including instructions, is further provided. The foregoing instructions may be executed by a processor in a terminal device to implement the information storage method in the foregoing embodiment. For example, the non-volatile computer readable storage medium may be a ROM, a random access memory (RAM), a CD-ROM, a magnetic tape, a floppy disk, an optical data storage device, or the like.

Figure 6:
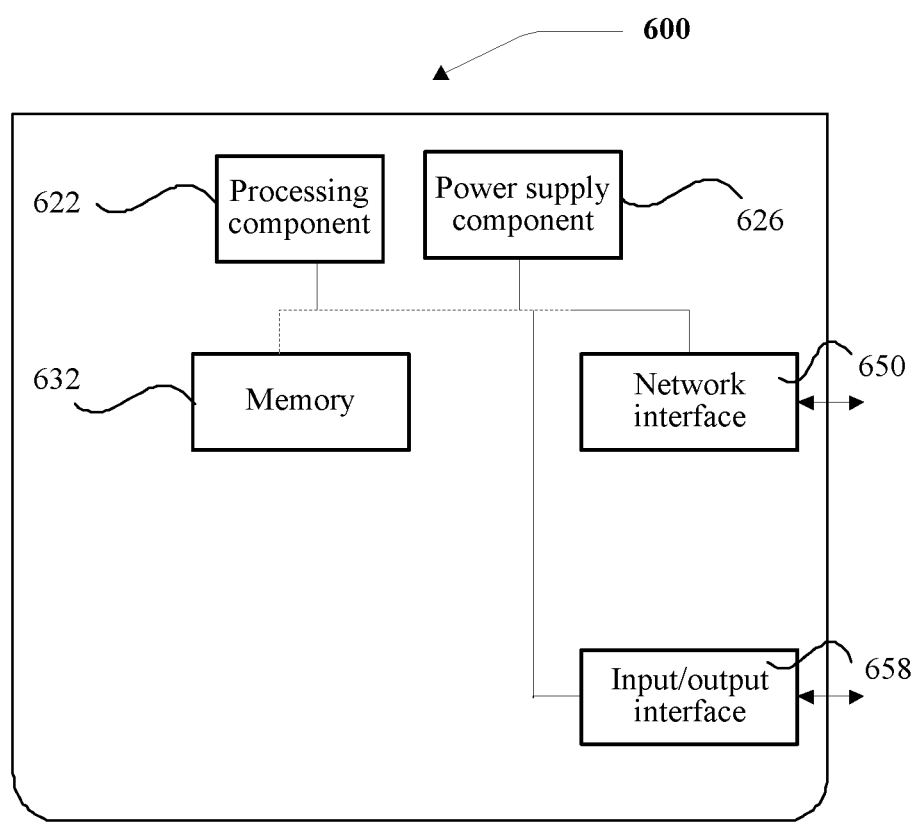
FIG. 6 is a block diagram of an information storage apparatus according to an embodiment of the present disclosure.

FIG. 6 is a block diagram of an information storage apparatus according to an embodiment of the present disclosure. For example, the apparatus 600 may be provided as a server. Referring to FIG. 6, the apparatus 600 includes a processing component 622 that further includes one or more processors, and a memory resource represented by a memory 632, which is configured to store instructions, such as an application program, executable by the processing component. The application program stored in the memory 632 may include one or more modules each corresponding to a group of instructions. In addition, the processing component 622 is configured to execute the instructions to perform the method executed by the server in the foregoing embodiment of the information storage method.

The apparatus 600 may further include a power supply component 626 configured to perform power supply management of the apparatus 600, a wired or wireless network interface 650 configured to connect the apparatus 600 to a network, and an input/output (I/O) interface 658. The apparatus 600 can operate an operating system stored in the memory 632, such as Windows Server™, Mac OS X™, Unix™, Linux™, Free BSD™, or the like.

In an exemplary embodiment, a non-volatile computer readable storage medium including instructions, such as a memory including instructions, is further provided. At least one instruction is stored in the storage medium. The foregoing at least one instruction may be executed by a processor in a server to implement the information storage method applied to a server in the foregoing embodiment. The foregoing at least one instruction may also be executed by a processor in a terminal device to implement the information storage method applied to a terminal device in the foregoing embodiment. For example, the non-volatile computer readable storage medium may be a ROM, a random access memory (RAM), a CD-ROM, a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An information storage method, applied to a server having one or more processors and memory storing a plurality of program instructions to be executed by the one or more processors, the method comprising:
receiving an information storage request sent by a terminal device, the information storage request carrying a first user identifier, an account address, and a to-be-stored ciphertext, wherein the account address corresponds to a balance amount;
performing identity authentication on a user according to the first user identifier;
generating a serving end serialization factor according to preset configuration information after the identity authentication succeeds;
obtaining a plurality of ciphertext fragments of the to-be-stored ciphertext according to the serving end serialization factor and the to-be-stored ciphertext, wherein obtaining the plurality of ciphertext fragments comprises randomly combining characters included in the to-be-stored ciphertext with random characters using a preset serialization algorithm and the serving end serialization factor, and wherein the serving end serialization factor is generated by the server;
storing the account address corresponding to the first user identifier, and respectively storing, corresponding to the account address, the plurality of ciphertext fragments into different ciphertext databases;
obtaining, according to a target account address, at least two ciphertext fragments corresponding to the target account address when receiving a ciphertext obtaining request sent by the terminal device, the ciphertext obtaining request carrying the target account address;
deserializing the at least two ciphertext fragments according to the serving end serialization factor, to obtain a ciphertext corresponding to the target account address; and
sending the ciphertext to the terminal device, so that the terminal device decrypts the ciphertext according to a second encryption password that is input by the user, to obtain a private key corresponding to the ciphertext.

2. The method according to claim 1, further comprising:
receiving a password modification request sent by the terminal device, the password modification request having a second user identifier;
obtaining, according to the second user identifier, the second user identifier corresponding to at least one ciphertext;
sending the at least one ciphertext to the terminal device, wherein the terminal device decrypts the at least one ciphertext according to an original encryption password that is input by the user, re-encrypts, according to a new encryption password that is input by the user, at least one private key obtained after the decryption, and returns at least one new ciphertext obtained after the re-encryption; and
updating, according to the second user identifier, the at least one ciphertext corresponding to the second user identifier with the at least one new ciphertext.

3. The method according to claim 1, wherein the account address is used when shared data stored in blocks is generated in a data sharing system and the to-be-stored ciphertext is generated by encrypting a private key corresponding to the account address using a first encryption password.

4. The method according to claim 3, further comprising:
detecting an encryption password modification operation;
obtaining an original encryption password and a new encryption password that are input by a user;
obtaining, when the original encryption password is consistent with an encryption password specified by the user, at least one ciphertext encrypted by using the original encryption password;
decrypting each of the at least one ciphertext by using the original encryption password, to obtain at least one private key corresponding to the at least one ciphertext;
re-encrypting each of the at least one private key by using the new encryption password, to obtain at least one new ciphertext corresponding to the at least one private key; and
sending the at least one new ciphertext to the server, so that the server replaces the at least one ciphertext corresponding to the first user identifier with the at least one new ciphertext.

5. The method according to claim 3, wherein the encrypting the private key based on the first encryption password comprises:
encrypting the private key according to the first encryption password and a first preset encryption algorithm, to obtain a private key ciphertext;
obtaining signature information of the private key according to a second preset encryption algorithm; and
using the private key ciphertext and the signature information of the private key as the to-be-stored ciphertext.

6. The method according to claim 3, further comprising:
obtaining a ciphertext corresponding to the target account address when a second encryption password corresponds to an encryption password specified by the user;
decrypting, according to the second encryption password and a first preset encryption algorithm, a private key ciphertext comprised in the ciphertext, to obtain decrypted information;
obtaining signature information of the decrypted information according to the second preset encryption algorithm; and
determining that the decrypted information is a private key corresponding to the target account address when the signature information of the decrypted information is the same as signature information comprised in the ciphertext.

7. A server, comprising:
one or more processors, memory coupled to the one or more processors, and a plurality of program instructions stored in the memory that, when executed by the one or more processors, cause the server to perform the following operations:
receiving an information storage request sent by a terminal device, the information storage request carrying a first user identifier, an account address, and a to-bestored ciphertext, wherein the account address corresponds to a balance amount;
performing identity authentication on a user according to the first user identifier;
generating a serving end serialization factor according to preset configuration information after the identity authentication succeeds;
obtaining a plurality of ciphertext fragments of the to-be-stored ciphertext according to the serving end serialization factor and the to-be-stored ciphertext, wherein obtaining the plurality of ciphertext fragments comprises randomly combining characters included in the to-be-stored ciphertext with random characters using a preset serialization algorithm and the serving end serialization factor, and wherein the serving end serialization factor is generated by the server;
storing the account address corresponding to the first user identifier, and respectively storing, corresponding to the account address, the plurality of ciphertext fragments into different ciphertext databases;
obtaining, according to a target account address, at least two ciphertext fragments corresponding to the target account address when receiving a ciphertext obtaining request sent by the terminal device, the ciphertext obtaining request carrying the target account address;
deserializing the at least two ciphertext fragments according to the serving end serialization factor, to obtain a ciphertext corresponding to the target account address; and
sending the ciphertext to the terminal device, so that the terminal device decrypts the ciphertext according to a second encryption password that is input by the user, to obtain a private key corresponding to the ciphertext.

8. The server according to claim 7, wherein the operations further include:
receiving a password modification request sent by the terminal device, the password modification request having a second user identifier;
obtaining, according to the second user identifier, the second user identifier corresponding to at least one ciphertext;
sending the at least one ciphertext to the terminal device, wherein the terminal device decrypts the at least one ciphertext according to an original encryption password that is input by the user, re-encrypts, according to a new encryption password that is input by the user, at least one private key obtained after the decryption, and returns at least one new ciphertext obtained after the re-encryption; and
updating, according to the second user identifier, the at least one ciphertext corresponding to the second user identifier with the at least one new ciphertext.

9. The server according to claim 7, wherein the account address is used when shared data stored in blocks is generated in a data sharing system and the to-be-stored ciphertext is generated by encrypting a private key corresponding to the account address using a first encryption password.

10. The server according to claim 9, wherein the operations further include:
detecting an encryption password modification operation;
obtaining an original encryption password and a new encryption password that are input by a user;
obtaining, when the original encryption password is consistent with an encryption password specified by the user, at least one ciphertext encrypted by using the original encryption password;
decrypting each of the at least one ciphertext by using the original encryption password, to obtain at least one private key corresponding to the at least one ciphertext;
re-encrypting each of the at least one private key by using the new encryption password, to obtain at least one new ciphertext corresponding to the at least one private key; and
sending the at least one new ciphertext to the server, so that the server replaces the at least one ciphertext corresponding to the first user identifier with the at least one new ciphertext.

11. The server according to claim 7, wherein the encrypting the private key based on the first encryption password comprises:
encrypting the private key according to the first encryption password and a first preset encryption algorithm, to obtain a private key ciphertext;
obtaining signature information of the private key according to a second preset encryption algorithm; and
using the private key ciphertext and the signature information of the private key as the to-be-stored ciphertext.

12. The server according to claim 7, wherein the operations further include:
obtaining a ciphertext corresponding to the target account address when a second encryption password corresponds to an encryption password specified by the user;
decrypting, according to the second encryption password and a first preset encryption algorithm, a private key ciphertext comprised in the ciphertext, to obtain decrypted information;
obtaining signature information of the decrypted information according to the second preset encryption algorithm; and
determining that the decrypted information is a private key corresponding to the target account address when the signature information of the decrypted information is the same as signature information comprised in the ciphertext.

13. A non-transitory computer readable storage medium storing a plurality of instructions in connection with a server having one or more processors, wherein the plurality of instructions, when executed by the one or more processors, cause the server to perform a plurality of operations including:
receiving an information storage request sent by a terminal device, the information storage request carrying a first user identifier, an account address, and a to-be-stored ciphertext, wherein the account address corresponds to a balance amount;
performing identity authentication on a user according to the first user identifier;
generating a serving end serialization factor according to preset configuration information after the identity authentication succeeds;
obtaining a plurality of ciphertext fragments of the to-be-stored ciphertext according to the serving end serialization factor and the to-be-stored ciphertext, wherein obtaining the plurality of ciphertext fragments comprises randomly combining characters included in the to-be-stored ciphertext with random characters using a preset serialization algorithm and the serving end serialization factor, and wherein the serving end serialization factor is generated by the server;
storing the account address corresponding to the first user identifier, and respectively storing, corresponding to the account address, the plurality of ciphertext fragments into different ciphertext databases;

obtaining, according to a target account address, at least two ciphertext fragments corresponding to the target account address when receiving a ciphertext obtaining request sent by the terminal device, the ciphertext obtaining request carrying the target account address;

deserializing the at least two ciphertext fragments according to the serving end serialization factor, to obtain a ciphertext corresponding to the target account address; and sending the ciphertext to the terminal device, so that the terminal device decrypts the ciphertext according to a second encryption password that is input by the user, to obtain a private key corresponding to the ciphertext.

14. The non-transitory computer readable storage medium according to claim 13, wherein the operations further include:

receiving a password modification request sent by the terminal device, the password modification request having a second user identifier;

obtaining, according to the second user identifier, the second user identifier corresponding to at least one ciphertext;

sending the at least one ciphertext to the terminal device, wherein the terminal device decrypts the at least one ciphertext according to an original encryption password that is input by the user, re-encrypts, according to a new encryption password that is input by the user, at least one private key obtained after the decryption, and returns at least one new ciphertext obtained after the re-encryption; and updating, according to the second user identifier, the at least one ciphertext corresponding to the second user identifier with the at least one new ciphertext.

15. The non-transitory computer readable storage medium according to claim 13, wherein the account address is used when shared data stored in blocks is generated in a data sharing system and the to-be-stored ciphertext is generated by encrypting a private key corresponding to the account address using a first encryption password.

16. The non-transitory computer readable storage medium according to claim 13, wherein the encrypting the private key based on the first encryption password comprises:

encrypting the private key according to the first encryption password and a first preset encryption algorithm, to obtain a private key ciphertext;

obtaining signature information of the private key according to a second preset encryption algorithm; and using the private key ciphertext and the signature information of the private key as the to-be-stored ciphertext.

17. The non-transitory computer readable storage medium according to claim 13, wherein the operations further include:

obtaining a ciphertext corresponding to the target account address when a second encryption password corresponds to an encryption password specified by the user;

decrypting, according to the second encryption password and a first preset encryption algorithm, a private key ciphertext comprised in the ciphertext, to obtain decrypted information;

obtaining signature information of the decrypted information according to the second preset encryption algorithm; and determining that the decrypted information is a private key corresponding to the target account address when the signature information of the decrypted information is the same as signature information comprised in the ciphertext.

* * * * *